(12) United States Patent
Chun et al.

(10) Patent No.: US 7,092,409 B2
(45) Date of Patent: *Aug. 15, 2006

(54) TIMING DISTRIBUTION REDUNDACY IN A WIRELESS NETWORK

(75) Inventors: Dexter Chun, San Diego, CA (US); Steve Hicks, San Diego, CA (US); Bob Knight, San Diego, CA (US); KC Lee, San Diego, CA (US); Ravi Palakodety, San Diego, CA (US); Dave Walker, Escondido, CA (US); Jun Zhang, San Diego, CA (US)

(73) Assignee: Telefonaktiebolaget LM Ericsson (publ), (SE)

( * ) Notice: Subject to any disclaimer, the term of this patent is extended or adjusted under 35 U.S.C. 154(b) by 774 days.

This patent is subject to a terminal disclaimer.

(21) Appl. No.: 09/814,658

(22) Filed: Mar. 21, 2001

(65) Prior Publication Data

US 2002/0136172 A1    Sep. 26, 2002

(51) Int. Cl.
  *H04L 12/42* (2006.01)
(52) U.S. Cl. .................................... 370/507
(58) Field of Classification Search ............. 370/310.1, 370/321, 389, 392, 395.1, 375, 503, 521, 370/518, 510
See application file for complete search history.

(56) References Cited

U.S. PATENT DOCUMENTS 5,510,797 A    4/1996  Abraham et al.
5,940,458 A *  8/1999  Suk ............................ 375/376
6,009,085 A   12/1999  Lechner
6,212,170 B1 * 4/2001  Cho ........................... 370/254
6,577,872 B1 * 6/2003  Lundh et al. ............... 455/502

FOREIGN PATENT DOCUMENTS

| EP | 0 522 775 A |  | 1/1993 |
| WO | WO-9821897 | * | 11/1996 |
| WO | WO 98 21897 A |  | 5/1998 |
| WO | WO 00 69102 A |  | 11/2000 |

* cited by examiner

*Primary Examiner*—Chau Nguyen
*Assistant Examiner*—Christopher Grey
(74) *Attorney, Agent, or Firm*—Coats & Bennett, P.L.L.C.

(57) ABSTRACT

A timing network for a wireless communication network includes first and second Timing Unit Board (TUB) and processor boards for processing speech channels of the radio network, each processor board having a local timer that is slave to "PSTN time" from a Public Switch Telephone Network (PSTN). The first and second TUB each alternately transmits a timing cell containing time information to each processor board over a transport network. Each processor board realigns its local timer with the time information contained in a received timing cell whenever its local timer drifts from the time information contained in the received timing cell by a predetermined time offset. When one of the TUBs fails to transmit timing cells to the processor boards or transmits timing cells containing erroneous time information, the processor boards rely on the remaining TUB for timing cells to realign their local timers.

26 Claims, 5 Drawing Sheets

TIMING DISTRIBUTION REDUNDACY IN A WIRELESS NETWORK

FIELD OF THE INVENTION

The present invention relates generally to wireless communication networks and, more particularly, to systems and methods for distributing timing information to processor boards in a wireless radio network.

BACKGROUND OF THE INVENTION

A wireless radio network may provide a communication link between callers on the Public Switch Telephone Network (PSTN) and callers on mobile stations (MSs), i.e., cellular phones. One exemplary wireless radio network is a Code Device Multiple Access (CDMA) cellular communication system. The PSTN supports Pulse Code Modulated (PCM) speech signals, which are digital speech signals sampled at a frequency of 8 KHz. The CDMA network comprises a Base Station Controller (BSC) for compressing groups of 160 PCM speech samples from the PSTN into 20 ms voice coded (vocoded) frames, and a Radio Base Station (RBS) for modulating the vocoded frames into spread-spectrum signals and broadcasting the spread-spectrum signals to the MSs.

The BSC further comprises processor boards for processing each speech channel of the BSC. The processing includes compressing PCM speech samples from the PSTN into 20 ms vocoded frames, and performing echo cancellation and radio management functions for each speech channel of the BSC.

In first and second generation BSCs, timing information is distributed to the processor boards from a timing server. The timing information is used to time the operations of the processor boards. Typically, the timing server is connected to a Global Positioning System (GPS) receiver to provide the processor boards with timing information based on "GPS time". This is done because the operations of the RBS and the MSs are both typically disciplined to "GPS time" to provide highly accurate timing between the RBS and the MSs.

FIG. 5 shows a timing distribution network for a BSC used in first and second generation CDMA networks. The timing network comprises a primary timing server 510, a secondary timing server 512, a first GPS receiver 515a connected to the primary timing server 510, and a second GPS receiver 515b connected to the secondary timing server 512. Each timing server 510 and 512 typically outputs a 50 Hz clock signal based on "GPS time" provided from its GPS receiver 515a and 515b. The timing network further comprises a network switch 522 connected to the output of each timing server 510 and 512 via cables 517, typically twisted pair RS-422 cables. The network switch 522 is also connected to processor boards 530a–530c in the BSC via a cable 527. The network switch 522 passes the clock signal from one of the two timing servers 510 and 512 to the processor boards 530a–530c. The timing network further comprises a network manager 525 for switching the network switch 522 between the clock signal from the primary timing server 510 and the clock signal from the secondary timing server 512.

During normal operation, the network switch 522 passes the clock signal from the primary timing server 510 to the processor boards 530a–530c. The processor boards 530a–530c use the received clock signal to time their operations. The network manager 525 monitors the primary timing server 510 to make sure that it is operating properly. The network manager 525 may do this by monitoring the toggling of a clock signal in the primary timing server 510, the stability of a Phase Lock Loop (PLL) in the primary timing server 510, and the availability of the GPS receiver 515a connected to the primary timing server 510. When the network manager 525 detects that the primary timing server 510 is not operating properly, the network manager 525 switches the network switch 522 over to the secondary timing server 512 so that the clock signal from the secondary timing server 512 is passed to the processor boards 530a–530c. Thus, the timing network responds to a failure of the primary timing server 510 by switching over to the secondary timing server 512, which acts as a backup timing server for the timing network.

A problem with this timing network is that it relies on proper operation of the network manager 525 for switching over from the primary timing server 510 to the secondary timing server 512 when the primary timing server 510 fails. However, the network manager 525 is not itself fault tolerant, thereby reducing the reliability of the timing network. In addition, the network manager 525 needs to monitor the operations of the primary timing server 510, adding both to the cost and complexity of the timing network. Furthermore, this timing network does not address potential transport errors of the clock signals in traveling from the timing servers 510 and 512 to the processor boards 530a–530c which may be due to a fault network switch 522.

SUMMARY OF THE INVENTION

The present invention addresses the problems of the prior art by providing a timing network for a BSC that does not require a network manager for handling a failure of a timing source to the processor boards.

In one embodiment, the timing network comprises a first and second Timing Unit Board (TUB), each TUB being connected to a GPS receiver. The timing network further comprises processor boards including multiple Media Stream Boards (MSB) for compressing groups of 160 PCM speech samples from a PSTN into 20 ms vocoded frames, and multiple Special Purpose Boards (SPB) for reformatting the vocoded frames from the MSB into over-the-air CDMA vocoded frames. Each one of the MSB and the SPB has a local timer that is slave to "PSTN time" from the PSTN.

Each one of the first and second TUB receives "GPS time" from its GPS receiver, and uses the received "GPS time" to generate timing cells, each timing cell containing time information closely synchronized with "GPS time". The first and second TUB alternately transmit a timing cell to each one of the MSB and the SPB over an Asynchronous Transfer Mode (ATM) network so that each one of the MSB and the SPB alternately receives a timing cell from the first and second TUB. Each one of the MSB and the SPB realigns its local timer with time information contained in a received timing cell whenever its local timer drifts from the time information contained in the received timing cell by a predetermined time offset, preferably 1 ms. This keeps the local timers of the MSB and the SPB to within approximately 1 ms of "GPS time".

An advantage of the timing network according to this embodiment is that it does not require a network manager when one of the first and second TUB stops transmitting timing cells due to a failure. This is because each one of the MSB and the SPB alternately receives a timing cell from the first and second TUB. When one of the TUBs stops transmitting timing cells, the MSB and the SPB rely on the remaining TUB for timing cells to realign their local timers with "GPS time".

In another embodiment, each one of the MSB and SPB is able to isolate a TUB transmitting "bad" timing cells containing erroneous time information, which may be caused by a transport error. In a first step, each one of the MSB and the SPB calculates a time difference between its local timer and time information contained in a timing cell received from one of the TUBs. If the time difference exceeds an error threshold, preferably 2 ms, then each one of the MSB and the SPB calculates a time difference between its local timer and time information contained in a timing cell received from the other TUB. If the second time difference is within the error threshold, then each one of the MSB and the SPB assumes that the TUB in the first time difference is transmitting "bad" timing cells and ignores the timing cells from that TUB. In this case, the MSB and the SPB rely on the remaining TUB for timing cells to realign their local time with "GPS time".

Other objects and features of the present invention will become apparent from consideration of the following description taken in conjunction with the accompanying drawings.

BRIEF DESCRIPTION OF THE DRAWINGS

The drawings illustrate both the design and utility of the preferred embodiments of the present invention, in which similar elements in different embodiments are referred to by the same reference numbers for purposes of ease in illustration of the invention, wherein.

DETAILED DESCRIPTION OF THE PREFERRED EMBODIMENTS

Figure 1:
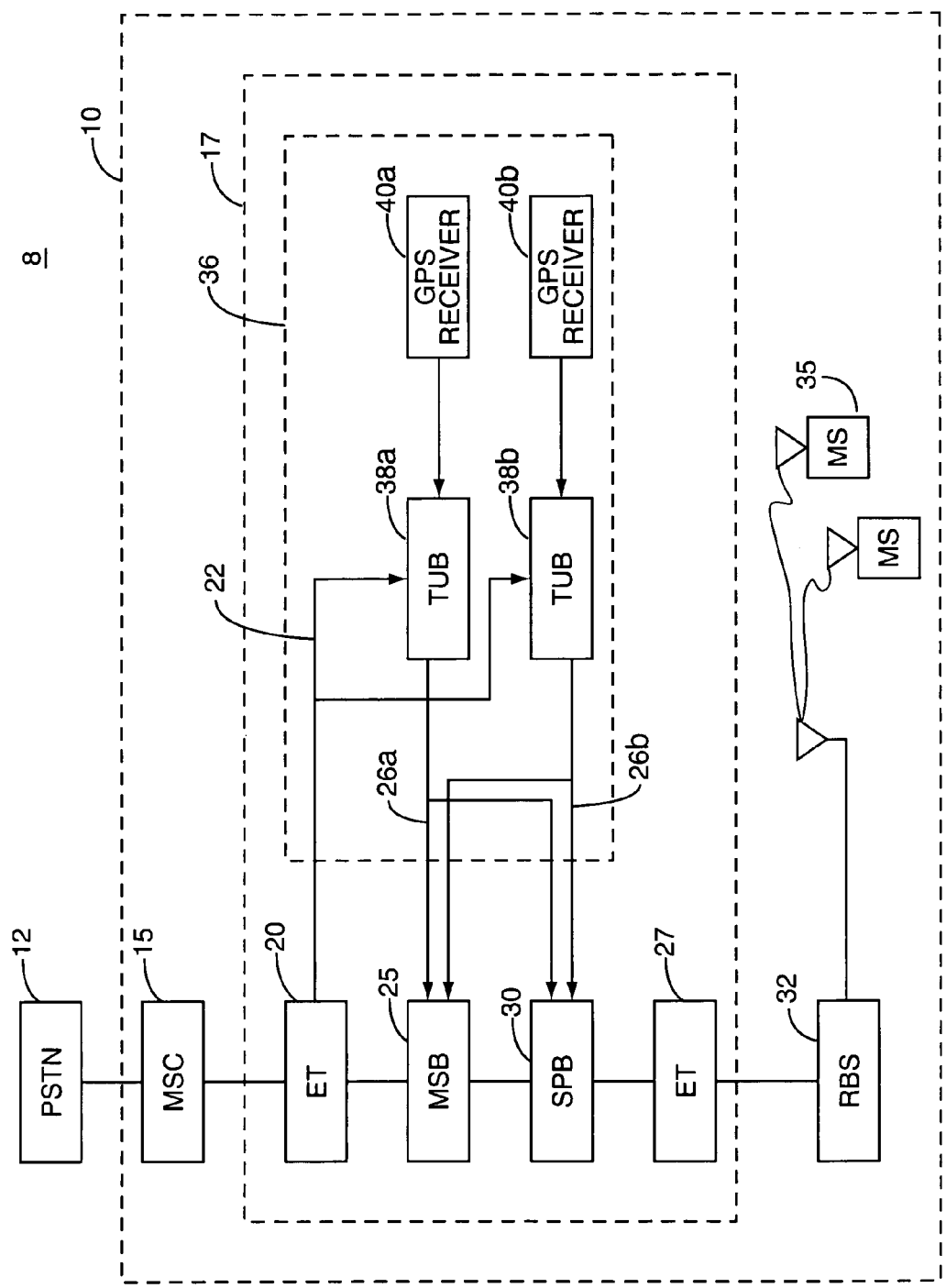
FIG. 1 is a block diagram of a phone network including a timing network according to one embodiment of the present invention.

FIG. 1 shows an overview of an exemplary communications network 8 according to the invention. The network 8 comprises a PSTN 12 connected to a radio network 10. The radio network may be, for example, a CDMA mobile communication system. The PSTN 12 supports PCM speech signals, which are 64 kps digital speech signals sampled at a frequency of 8 KHz. The network 10 comprises a Mobile Switch Center (MSC) 15, a BSC 17, a RBS 32, and a plurality of MSs 35. The MSC 15 routes the PCM speech signals from the PSTN 12 to the BSC 17. The BSC 17 compresses the PCM speech signals into vocoded frames of compressed speech data. The RBS 32 then modulates the vocoded frames into spread-spectrum signals and broadcasts the spread-spectrum signals to the mobile stations (MSs) 35.

The BSC 17 may comprise a first Exchange Terminal (ET) 20, a Media Stream Board (MSB) 25 coupled to the first ET 20, a Special Purpose Board (SPB) 30 coupled to the MSB 25, and a second ET 27 coupled to the SPB 30. For simplicity, the BSC 17 is shown only having one MSB 25 and one SPB 30, although a typical BSC 17 can support many MSBs and SPBs. The first ET 20 provides an interface between the MSC 15 and the BSC 17. The MSB 25 compresses groups of 160 PCM speech samples from the PSTN 12 into 20 ms vocoded frames of compressed speech data. The MSB 25 may also perform echo cancellation for speech channels of the BSC 17. The SPB 30 reformats the 20 ms vocoded frames from the MSB 25 into over-the-air CDMA vocoded frames. The SPB 30 may also perform radio management functions for speech channels of the BSC 17. The second ET 27 provides an interface between the BSC 17 and the RBS 32.

The BSC 17 further comprises a timing network 36 for distributing timing information to the MSB 25 and the SPB 30. The timing network 36 comprises a first Timing Unit Board (TUB) 38a and a second TUB 38b. Each TUB 38a and 38b is connected to the first ET 20 and a GPS receiver 40a and 40b. Each TUB 38a and 38b receives an 8 KHz frequency reference clock signal 22 from the first ET 20. The 8 KHz reference clock signal 22 is derived from the 8 KHz sampling frequency of the PCM speech signals from the PSTN 12, and therefore tracks "PSTN time". Although the first and second TUB 38a and 38b are shown receiving the reference clock signal 22 from the first ET 20, the first and second TUB 38a and 38b may receive a reference clock signal from different ETs. Each TUB 38a and 38b also receives Universal Coordinated Time (UTC) from its respective GPS receiver 40a and 40b at a frequency of 1 Hz or once per second. The UTC from each GPS receiver 40a and 40b provides the respective TUB 38a and 38b with absolute time-of-day information based on "GPS time".

Each TUB 38a and 38b has a local digital timer that uses the received UTC from the respective GPS receiver 40a and 40b to track "GPS time" at a rate of once per second. Each local timer also uses the 8 KHz reference clock signal 22 to track time between transmissions of the UTC from the respective GPS receiver 40a and 40b. Because each TUB 38a and 38b receives a UTC every second, the local timer of each TUB 40a and 40b is frequently updated with "GPS time", and therefore provides a very accurate indication of "GPS time".

Each TUB 38a and 38b generates timing cells, each timing cell containing time-of-day based on its local timer. Each TUB 38a and 38b then transmits the timing cells to the MSB 25 and the SPB 30 at regular intervals to provide the MSB 25 and the SPB30 with an accurate indication of "GPS time". Preferably, the timing cells are transmitted to the MSB 25 and the SPB 30 over an Asynchronous Transfer Mode (ATM) network 26a and 26b in which the timing cells are transmitted in ATM packets using switched virtual circuits (SVCs). Alternately, the timing cells can be transmitted to the MSB 25 and the SPB 30 over any type of medium including, for example, an Ethernet network or a Universal Serial Bus (USB).

Additional details of preferred embodiments of each TUB 38a and 38b can be found in co-pending application Ser. No. 09/713,778, entitled "Method and System For Controlling Audible Speech Distortion in a GPS based CDMA network using ATM transport," the disclosure of which is expressly incorporated herein by reference.

Each one of the MSB 25 and the SPB 30 has an internal local timer that is slave to "PSTN time" from the PSTN network 12. Each local timer may be realized using a Reference Frequency (RFN) counter that free runs off a clock signal derived from the 8 KHz sampling frequency of the PSTN 12. Each one of the MSB 25 and the SPB 30 uses its local timer to time its operations. The MSB 25, for example, uses its local timer to time the compression of PCM speech samples from the PSTN 12 in the 20 ms vocoded frames. Each one of the MSB 25 and the SPB 30 realigns its local timer with "GPS time" using a received timing cell from one of the TUBs 38a and 38b whenever its local timer drifts from the time information contained in the received timing cell by a predetermined time offset, for example, approximately 1 ms. Thus, even though the operations of the MSB and SPB are each timed off of an internal local timer that drifts from "GPS time", the local timer is realigned with "GPS time" whenever the local timer drifts from the time information contained in a received timing cell by 1 ms or more. This ensures that the local timers of the MSB and the SPB are kept to within approximately 1 ms of "GPS time".

Figure 2:
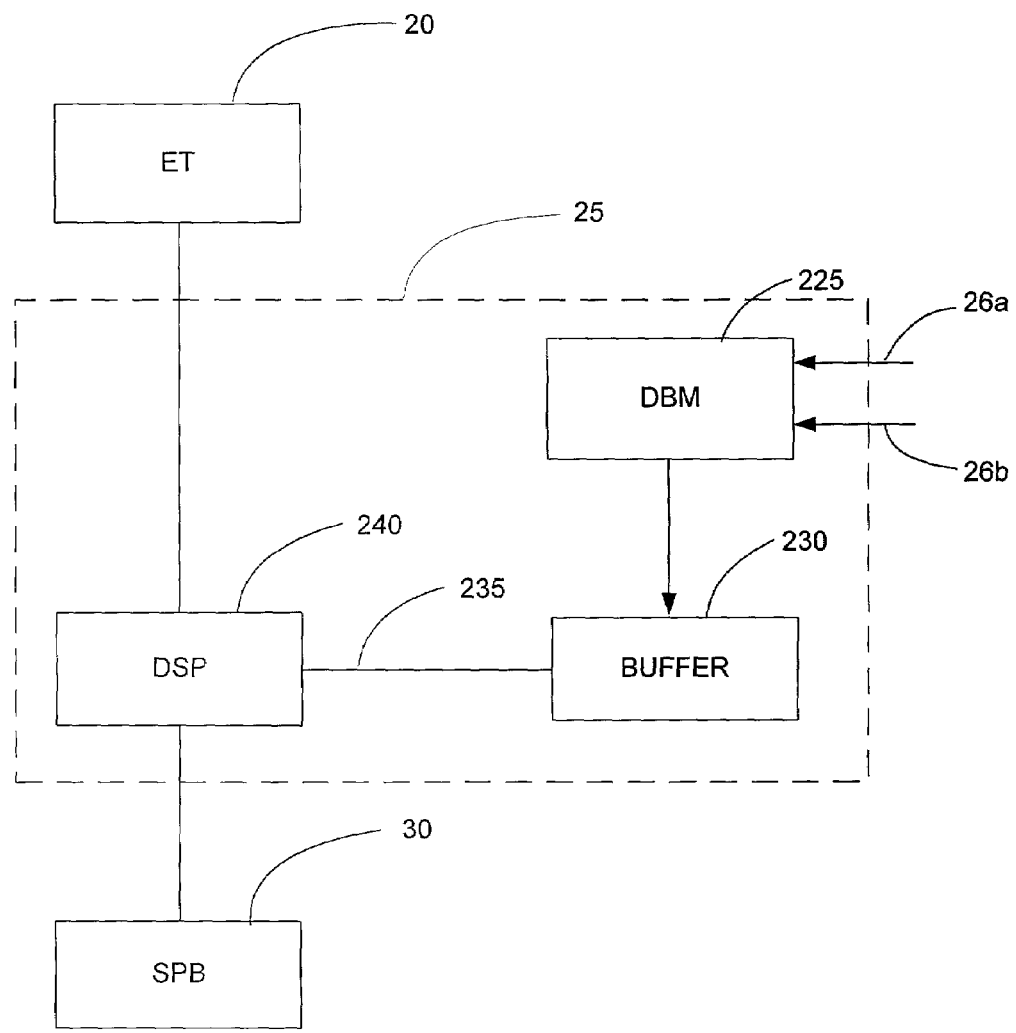
FIG. 2 is a block diagram of a Media Stream Board (MSB) according to one embodiment of the present invention.

FIG. 2 shows an exemplary embodiment of the MSB 25 in greater detail. The MSB 25 comprises a Digital Signal Processor (DSP) 240. The DSP 240 compresses groups of 160 PCM speech samples originating from the PSTN 12 into 20 ms vocoded frames of compressed data in the forward direction (from the PSTN 12 to the MSs 35). The DSP 240 also decompresses 20 ms vocoded frames originating from the MSs 35 to produce PCM speech samples in the reverse direction (from the MSs 35 to the PSTN 12). The MSB 25 further comprises a Device Board Module (DBM) 225 that receives the timing cells from the first and second TUB 38a and 38b over the ATM network 26a and 26b. The DBM 225 stores the received timing cells in a memory buffer 230, which is accessible by the DSP 240 via, for example, a 32-bit X-bus 235.

The DSP 240 has a local timer that is slave to "PSTN time". The local timer may be realized using an RFN counter that free runs off a signal derived from the 8 KHZ sampling frequency of the PSTN 12. The DSP 240 uses its local timer to time the compression of PCM speech samples into the 20 ms vocoded frames and the decompression of 20 ms vocoded frames into PCM speech samples. The DSP 240 also accesses the GPS time-of-day information contained in a timing cell from the buffer 230 each time the DBM 225 receives a timing cell from one of the TUBs 38a and 38b. The DSP 240 uses the GPS time-of-day information to compare its local timer with "GPS time", and to realign its local timer with "GPS time" whenever its local timer drifts from "GPS time" by at least the predetermined time offset.

Although the MSB 25 is shown having one DSP, the MSB 25 may have several DSPs for processing different speech channels. In this case, each DSP may have a local timer to time its operations and each DSP has access to the GPS time-of-day information stored in the buffer 230 via a 32-bit X-bus.

Figure 5:
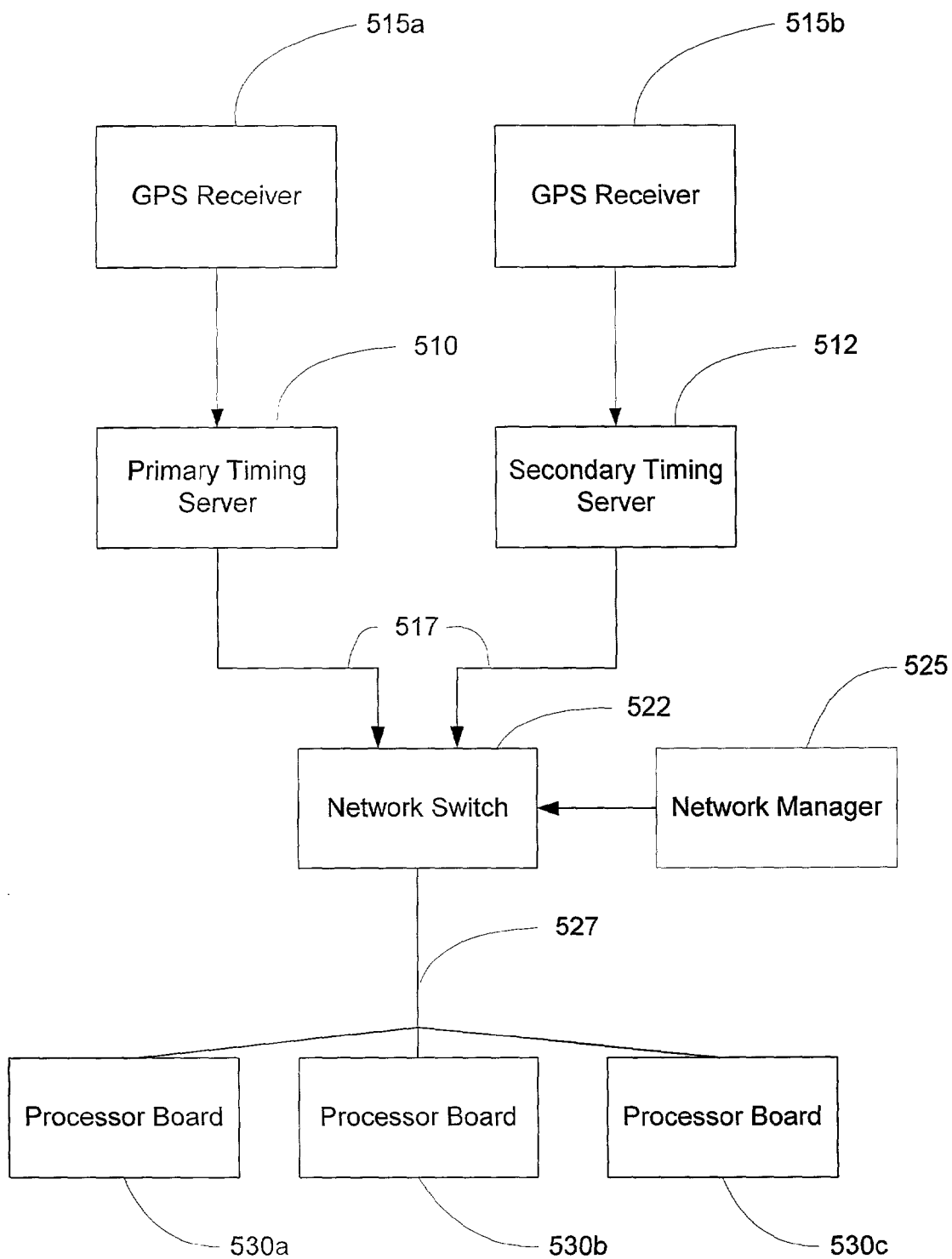
FIG. 5 is a block diagram of a prior art timing network for a Base Station Controller (BSC).

The timing network 36 according to the present invention distributes time to the processor boards of the BSC differently than the timing network according to the prior art shown in FIG. 5. In the timing network according to the prior art, each processor board 530a–530c in the BSC times its operations off of a clock signal received from the primary timing server 510. By contrast, in the timing network 36 according to the present invention, each one of the MSB 25 and the SPB 30 times its operation based on its local timer. The local timers of the MSB and the SPB are kept to within approximately 1 ms of "GPS time" by realigning the local timers with "GPS time" using the timing cells from the first and second TUB 38a and 38b.

For a BSC having many MSBs and SPBs, each TUB 38a and 38b, preferably, transmits timing cells to the MSBs and the SPBs one at a time. This is done because transmitting timing cells to too many processor boards in the BSC at once will create a large time delay between the first and the last transmitted timing cell due to congestion in the transport network.

In a preferred embodiment, each one of the MSB 25 and the SPB 30 alternately receives a timing cell from the first and second TUB 38a and 38b. This allows the MSB 25 and the SPB 30 to continue to operate when one of the first and second TUB 38a and 38b fails. In one condition, the MSB 25 may stop receiving timing cells from one of the first and second TUB 38a and 38b. This may occur, for example, if the GPS receiver 40 connected to one of the TUBs 38a and 38b becomes unavailable or if one of the TUBs 38a and 38b suffers a catastrophic failure. In this case, the MSB 25 can continue to operate using the timing cells received from the remaining TUB 38a or 38b. In addition, the time period between timing cells received by the MSB 25 increases because the MSB 25 only receives timing cells from one of the TUBs 38a and 38b. If, for example, the MSB 25 receives timing cells every 20 ms when both TUBs 38a and 38b are transmitting timing cells, then the MSB 25 receives timing cells every 40 ms when one of the TUBs 38a and 38 stops transmitting timing cells.

An advantage of the timing distribution network 36 according to the present invention is that it does not require a network manager for switching over from a primary timing server to a secondary timing server when the primary timing server fails. This is because the MSB 25 and the SPB 30 already alternately receive timing cells from both TUBs 38a and 38b. When one of the TUBs 38a and 38b fails, the MSB and the SPB rely on the remaining TUB 38a and 38b to receive timing cells.

In another embodiment, both TUBs 38a and 38b transmit timing cells to the MSB 25 and SPB 30, however, one of the TUBs 38a and 38b transmits "bad" timing cells containing erroneous time information. This may be caused, for example, by a transport error of timing cells in traveling from one of the TUBs 38a and 38b to the MSB 25 and the SPB 30. In this case, the MSB 25 and the SPB 30 are each able to isolate the TUB 38a and 38b transmitting the "bad" timing cells by comparing its local timer with timing cells received by both TUBs 38a and 38b.

The steps carried out by the MSB 25 for isolating a TUB 38a and 38b transmitting "bad" timing cells will be described with reference to FIG. 3. Although these steps are described in the context of the MSB 25, the same steps may be carried out by the SPB 30 for isolating a TUB 38a and 38b transmitting "bad" timing cells.

In step 310, the MSB 25 begins monitoring the timing cells received from the TUBs 38a and 38b for "bad" timing cells. In step 320, the MSB 25 calculates a time difference between its local timer and a timing cell received from one of the TUBs 38a and 38b. In step 330, the MSB 25 determines weather or not this time difference exceeds a predetermined error threshold, which is greater than the predetermined time offset and is, for example, 2 ms. If the time difference exceeds the error threshold, then the MSB 25 continues to step 340. In this case, the MSB 25 does not use the received timing cell to realign its local timer because a time difference exceeding the error threshold indicates a potentially "bad" timing cell. Otherwise, the MSB 25 starts back at step 320. In step 340, the MSB 25 calculates a time difference between its local timer and a timing cell received from the other TUB 38a or 38b. In step 350, the MBS 25 determines whether or not this time difference is within the error threshold. If the time difference is within the error threshold, then the MSB 25 moves to step 360 and assumes that the timing cell from the TUB in step 320 was "bad". In this case, the MBS 25 ignores the timing cells from the TUB in step 320 and continues to operate using the timing cells from the remaining TUB in step 340. If, however, the time difference between the local timing of the MSB 25 and the timing cell from the other TUB also exceeds the error threshold, then the MSB 25 moves to step 370. In this case, the MSB 25 is incapable of proper operation because it needs to receive accurate timing cells from at least one of the TUBs 38a and 38b. If the time differences between its local timer and the timing cells from both TUBs 38a and 38b continue to exceed the error threshold, then the MSB 25 may have to be retired from the BSC 17.

Figure 3:
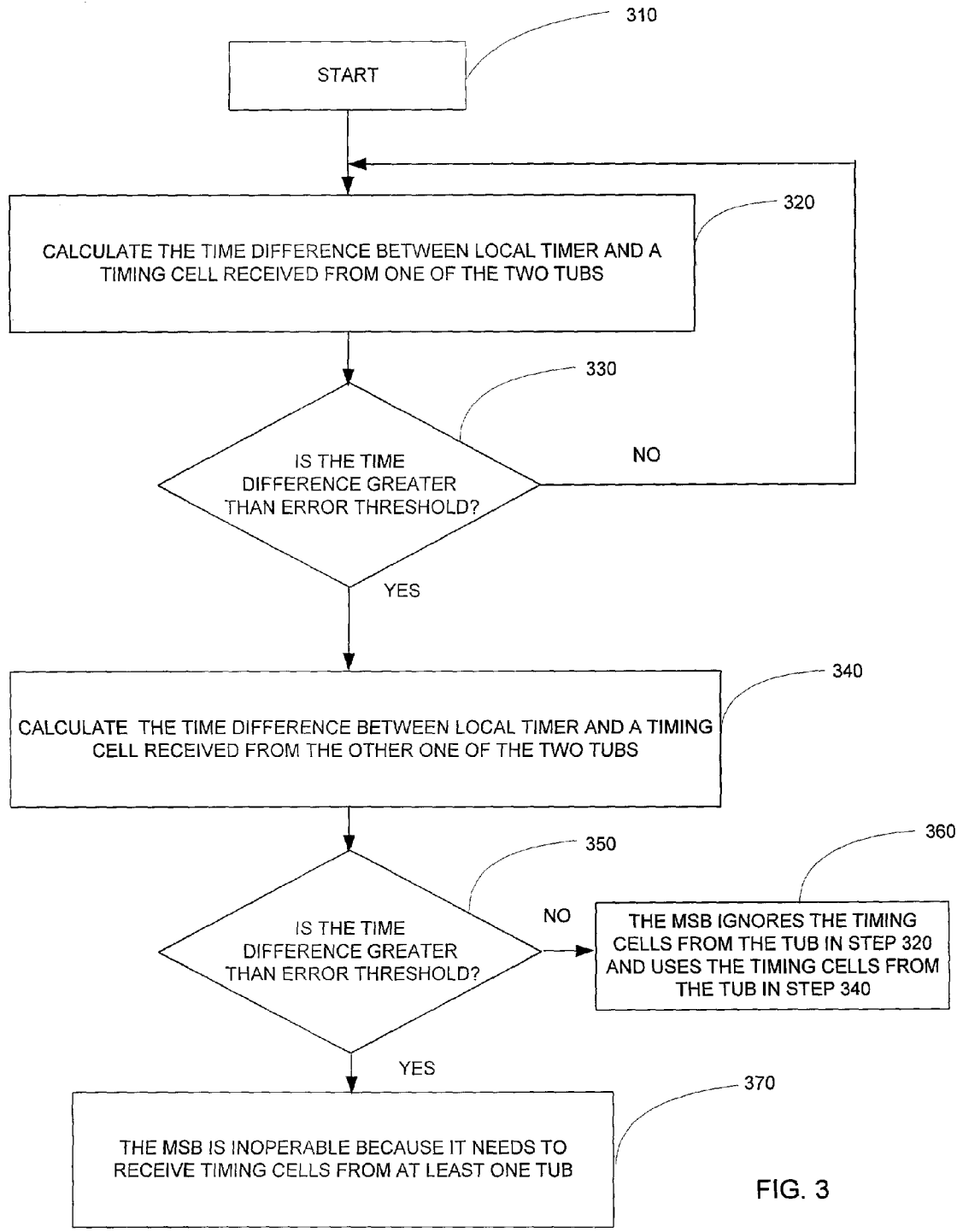
FIG. 3 is a flow chart of steps performed by the Media Stream Board (MSB) for isolating a Timing Unit Board (TUB) transmitting timing cells containing erroneous time information according to one embodiment of the present invention.

The MSB 25 may repeat steps in FIG. 3 any number of times before determining that one of the TUBs 38a or 38b is transmitting "bad" timing cells. For example, the MSB 25 may determine that a TUB 38a or 38b has "bad" timing cells after the time differences between its local timer and two consecutive timing cells from that TUB 38a or 38b exceed the error threshold. In addition, the MSB may periodically recheck timing cells from a TUB 38a or 38b determined to have "bad" timing cells. If the time differences between its local timer and timing cells from that TUB 38a or 38b fall back within the error threshold, then the MSB 25 may begin using the timing cells from that TUB 38a or 38b again.

Figure 4:
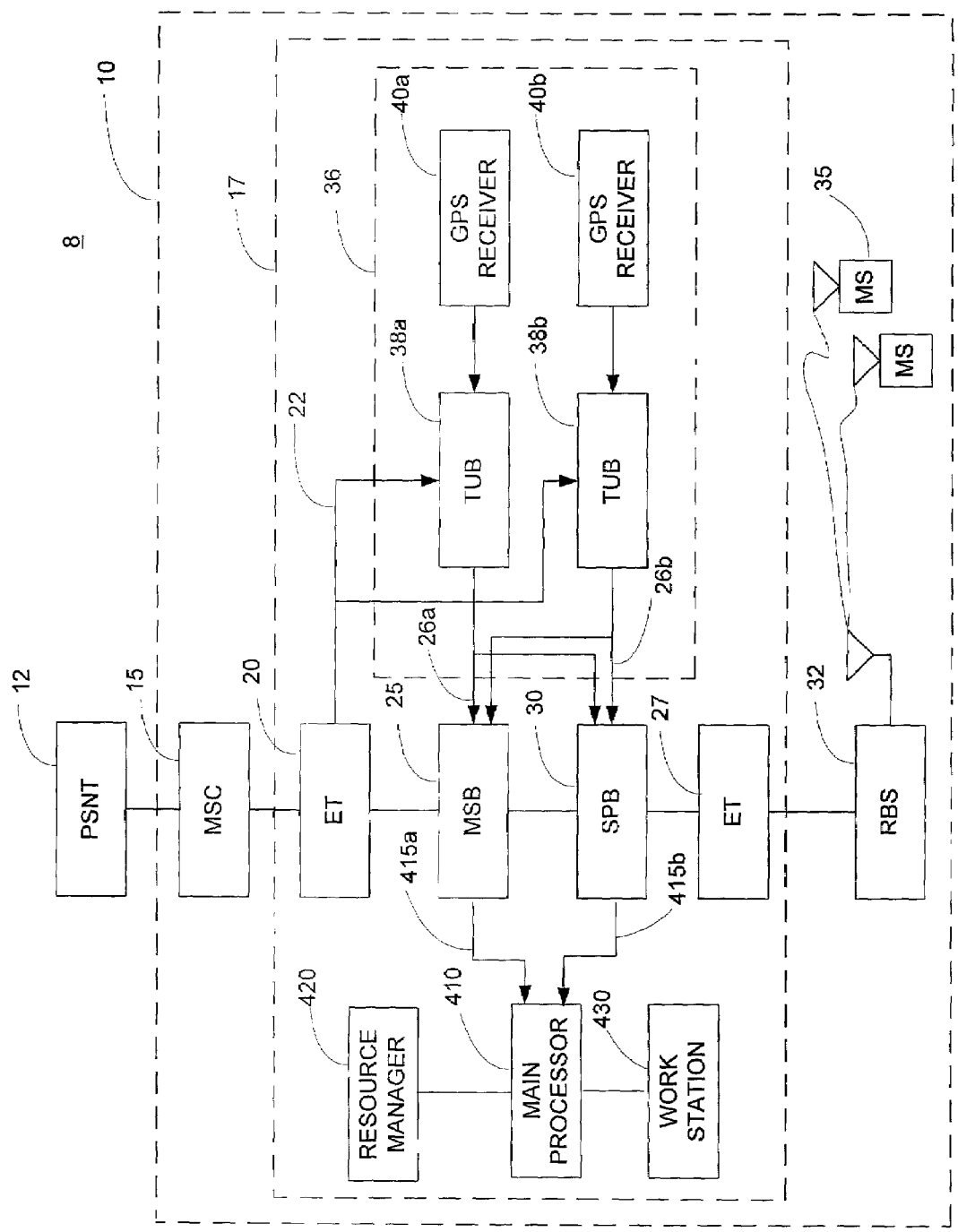
FIG. 4 is a block diagram of the phone network of FIG. 1 further comprising a network manager according to one embodiment of the present invention.

FIG. 4 shows the BSC of FIG. 1 further comprising a management network. The management network comprises a main processor 410 having a local database, a resource manager 420, and a workstation 430. The main processor 410 periodically retrieves operating status information from the MSB 25 and the SPB 30 via, for example, an ATM network 415a and 415b and stores the status information in its local database. Although the main processor 410 is shown connected to one MSB 25 and one SPB 30, those skilled in the art will appreciate that the main processor 410 may be connected to many MSBs and SPBs in the BSC 17. The resource manager 420 assigns or directs incoming calls to the MSB 25 and SPB 30 in the BSC 17 based on the availability of the MSB 25 and the SPB 30 to handle the calls. The workstation 430 accesses the operating status information for the MSB 25 and the SPB 30 stored in the database of the main processor 410 and displays the operating status information on a display, such as a CRT display. This allows a human operator at the workstation 430 to monitor the operating status of the MSB 25 and the SPB 30 in the BSC 17.

In this embodiment, the operating status information of each one of the MSB 25 and the SPB 30 includes a fault status flag. The fault status flag for each one of the MSB 25 and the SPB 30 may be stored in a local memory on the MSB 25 and the SPB 30, respectively. Each fault status flag, which may be 3-bits in length, indicates the timing condition of the MSB 25 or the SPB 30. The fault status flag may indicate a normal timing condition, for example, when the time differences between the respective local timer and timing cells from each TUB 38a and 38b are within the error threshold. The fault status flag may also indicate a "bad" TUB timing condition when the time differences between the respective local timer and timing cells from one of the TUBs 38a or 38b exceed the error threshold. In this case, the fault status flag may further indicate which one of the two TUBs 38a or 38b is transmitting the "bad" timing cells.

Finally, the fault status flag may indicate an inoperable timing condition when the time differences between the respective local timer and timing cells from both TUBs 38a and 38b exceed the error threshold.

The main processor 410 periodically retrieves the fault status flag from each one of the MSB 25 and SPB 30 via the ATM network 415a and 415b and stores the retrieved fault status flags in its local database. Preferably, the resource manager 420 can access the fault status flags stored in the database of the main processor 410 via an ATM network. This allows the resource manager 420 to periodically check the fault status flag of each one of the MSB 25 and the SPB 30 to determine the availability of each one of the MSB 25 and the SPB 30 to handle incoming calls. For example, when the fault status flag of the MSB 25 indicates an inoperable timing condition, the resource manager 420 does not assign incoming calls to the MSB 25.

The workstation 430 can also access the fault status flags stored in the database of the main processor 410. This allows the workstation 430 to display the faults status flags of the MSB 25 and the SPB 30 to a human operator on a display. That way, the human operator can monitor the fault status flag of each one of the MSB 25 and the SPB 30 and take appropriate actions. For example, if the fault status flag of the MSB 25 indicates an inoperable timing condition, the human operating may arrange to have the MSB 25 retired from the BSC 17. In addition, the fault status flags on the display can alert the human operator to a potential problem with one of the TUBs 38a and 38b. For example, if the fault status flags of many MSBs and SPBs in the BSC 17 indicate that one of the TUBs 38a and 38b is transmitting "bad" cells, then the human operator may arrange to have that TUB 38a and 38b retired from the BSC 17.

While various embodiments of the application have been described, it will be apparent to those of ordinary skill in the art that many more embodiments and implementations are possible that are within the scope of the present invention. For example, even though the invention was described using two TUBs, those skilled in the art will appreciate that more than two TUBs may be used in the timing network to increase its timing distribution redundancy. In this case the MSB and the SPB may each alternately receiving timing cells from each one of the TUBs in the timing network. Therefore, the invention is not to be restricted or limited except in accordance with the following claims and their equivalents.

What is claimed is:

1. A base station controller for a wireless network, comprising:
   a plurality of processor boards, each processor board having a local timer; and
   a plurality of timing units, each timing unit generating timing cells, each timing cell containing time information, and each timing unit transmitting timing cells to each one of the plurality of processor boards;
   wherein a processor board realigns its local timer with time information contained in a received timing cell whenever its local timer drifts from the time information contained in the received timing cell by a predetermined time offset.

2. The base station controller of claim 1, wherein the predetermined time offset is approximately 1 ms.

3. The base station controller of claim 1, wherein each processor board alternately receives a timing cell from each one of the timing units.

4. The base station controller of claim 1, wherein the timing cells are transmitted to the processor boards over an Asynchronous Transfer Mode (ATM) network.

5. The base station controller of claim 1, wherein the timing cells are transmitted to the processor boards over an Ethernet network.

6. The base station controller of claim 1, wherein the timing cells are transmitted to the processor boards over a universal serial bus.

7. The base station controller of claim 1, wherein a processor board does not realign its local timer with time information contained in a received timing cell when a time difference between its local timer and the time information contained in the received timing cell exceeds an error threshold, the error threshold being greater than the time offset.

8. The base station controller of claim 7, wherein the error threshold is approximately 2 ms.

9. The base station controller of claim 3, wherein at least one of the processor boards stores a fault status flag in a local memory, the fault status flag indicating a timing condition of the respective processor board.

10. The base station controller of claim 9, wherein the fault status flag indicates an inoperable timing condition of the respective processor board when time differences between the respective local timer and time information contained in a received timing cell from each one of the timing units exceed a predetermined error threshold.

11. The base station controller of claim 10, further comprising:
a main processor having a local database for periodically retrieving the fault status flag from the processor boards and storing the retrieved fault status flag in the local database; and
a resource manager for assigning incoming calls to the processor boards based on the retrieved fault status flag.

12. The base controller of claim 11, wherein the resource manager does not assign incoming calls to a processor board when the retrieved fault status flag of the processor board indicates an inoperable timing condition.

13. A method for distributing timing information to the processor boards in a base station controller comprising a plurality of processor boards, each processor board having a local timer, and a plurality of timing units, comprising the steps of:
generating timing cells from each one of the timing units, each timing cell containing time information;
transmitting timing cells from each one of the timing units to each one of the processor the processor boards; and
realigning the local timer of a processor board with time information contained in a received timing cell when its local timer drifts from the time information contained in the received timing cell by a predetermined time offset.

14. The method of claim 13, wherein the predetermined time offset is approximately 1 ms.

15. The method of claim 13 further comprising the step of alternately receiving a timing cell at a processor board from each one of the timing units.

16. The method of claim 13, further comprising the step of transmitting the timing cells to the processor boards over an Asynchronous Transfer Mode (ATM) network.

17. The method of claim 13, further comprising the step of transmitting the timing cells to the processor boards over an Ethernet network.

18. The method of claim 13, further comprising the step of transmitting the timing cells to the processor boards over a Universal Serial Bus.

19. The method of claim 13, further comprising the steps of not realigning the local timer of a processor board with time information contained in a received timing cell when a time difference between the local timer of the processor board and the received time information exceeds a predetermined error threshold, the error threshold being greater than the time offset.

20. The method of claim 19, wherein the predetermined error threshold is approximately 2 ms.

21. A transceiver comprising:
a plurality of processor boards; and
a timing network containing a plurality of timing units, each timing unit continuously providing a timing signal to each of the plurality of processor boards for setting a standard time.

22. The transceiver of claim 21, wherein each of the plurality of timing units provides its respective timing signal at a different time so as to alternate the continuous timing signals from each timing unit.

23. The transceiver of claim 22, wherein the timing signals are generated from a GPS timing reference and are used to adjust a local timer in each one of the plurality of processor boards to the standard time.

24. A wireless communication system, comprising:
a mobile station (MS); and
a base station (BS) in communication with the MS, the BS comprising:
a plurality of processor boards; and
a timing network containing a plurality of timing units, each timing unit continuously providing a timing signal to each of the plurality of processor boards for setting a standard time.

25. The system of claim 24, wherein each of the plurality of timing units provides its respective timing signal at a different time so as to alternate the continuous timing signals from each timing unit.

26. The system of claim 25, wherein the timing signals are generated from GPS timing reference and are used to adjust a local timer in each one of the plurality of processor boards to the standard time.

* * * * *

UNITED STATES PATENT AND TRADEMARK OFFICE
CERTIFICATE OF CORRECTION

PATENT NO. : 7,092,409 B2  Page 1 of 1
APPLICATION NO. : 09/814658
DATED : August 15, 2006
INVENTOR(S) : Chun et al.

It is certified that error appears in the above-identified patent and that said Letters Patent is hereby corrected as shown below:

On the Title Page, in Field (54), in the "Title", in Column 1, Line 1, delete "REDUNDACY" and insert -- REDUNDANCY --, therefor.

In Fig 4, Sheet 4 of 5, Tag "12", delete "PSNT" and insert -- PSTN --, therefor.

In Column 1, Line 1, delete "REDUNDACY" and insert -- REDUNDANCY --, therefor.

In Column 9, Line 50, in Claim 13, delete "the processor" before "boards".

Signed and Sealed this

Ninth Day of February, 2010

David J. Kappos
*Director of the United States Patent and Trademark Office*